Jan. 30, 1968 L. J. POTTER 3,366,834
BRILLIANCE CONTROL SYSTEM FOR INDICATING LAMPS
Filed March 9, 1966

INVENTOR
Lynn J. Potter
BY Scofield, Kokjer, Scofield & Lowe
ATTORNEYS

United States Patent Office 3,366,834
Patented Jan. 30, 1968

3,366,834
BRILLIANCE CONTROL SYSTEM FOR
INDICATING LAMPS
Lynn J. Potter, Shawnee Mission, Kans., assignor to King
Radio Corporation, Inc., a corporation of Kansas
Filed Mar. 9, 1966, Ser. No. 541,428
10 Claims. (Cl. 315—131)

ABSTRACT OF THE DISCLOSURE

An automatic brillance control system for aircraft navigation indicating lamps utilizing a voltage source and an indicating lamp, and a voltage control means including a photosensitive device and a transistor connected between the lamp and the voltage source, said photosensitive device operable to control the base bias of said transistor to effectuate an automatic varying of the voltage applied in response to the ambient light conditions around the lamp.

---

The present invention relates in general to signalling systems incorporating indicating lamps therein and refers more particularly to an electrical system which eliminates the need for manual adjustment of the brilliance of the indicating lamps when the operating ambient light conditions incident thereon change even slightly.

It is one of the principal objects of the invention to provide a new and improved means for automatically controlling the brilliance of an electrically operated indicating lamp.

It is also an object of the invention to provide an uniquely constructed signal light system, for use in aircraft or other vehicles, that is specifically designed to increase the safe operation of said vehicle.

In reference to the latter, there are several vital illuminated instruments, including indicating lamps, upon whose performance rests the safe and sure operation of the piloted aircraft. Not the least of these are the marker beacon lights which form an integral part of what is commonly referred to in the aviation electronics art as the ILS (Instrument Landing Systems). It is an important and significant feature of the invention that the brilliance of the marker beacon lamps is automatically regulated and controlled for both optimal indication of the condition of said lamps and for the effects on the vision of the pilots during the critical ON time of same.

Present marker beacon receivers include a plurality of different colored indicating lamps usually located on a panel directly in front of the pilot. The brilliance of these lamps is controlled by an iris arrangement which must be manually adjusted for optimum on board aircraft piloting conditions. As is the usual case, the manually adjusted iris will be set for maximum brilliance during daytime flying. Accordingly, when darkness approaches or when the ambient light conditions are completely darkened, the manually adjusted marker beacon indicating lamps will require a further manual adjustment to dim the resulting brilliance of same when they are turned ON. If a pilot forgets to make this manual adjustment, the sudden turning ON of the indicating lamps at full brilliance in a darkened operation area is sufficient to seriously hamper if not momentarily blind the pilot during the very critical and busy piloting stages of landing the aircraft.

Likewise, when the ambient light is quite bright, such as may be the case when sunlight is shining directly on the indicating lamps, a manually adjusted lamp in its dim brilliance condition may not be visible to the pilot at all when needed most, e.g., during the landing operation. It is also a feature of the invention that the indicating lamp brilliance is proportionally controlled by an electrical circuit and as such has many possible degrees of illumination between the full brilliance and dim brilliance conditions, said degrees of illumination depending on the ambient light and how the indicating lamp would optimally affect the pilot's vision.

A further object of the invention is to provide a signalling system of the character described that lends itself toward compactness, weight reduction and lower manufacturing costs as well as increasing the performance, reliability and operational life of both the system and the indicating lamps used therein.

Other and further objects of the invention, together with the features of novelty whereby the objects are achieved, will appear in the course of the following description.

In the drawings, which form a part of the specification and are to be read in conjunction therewith, and in which like reference numerals refer to like parts in the various views.

Figure 1:
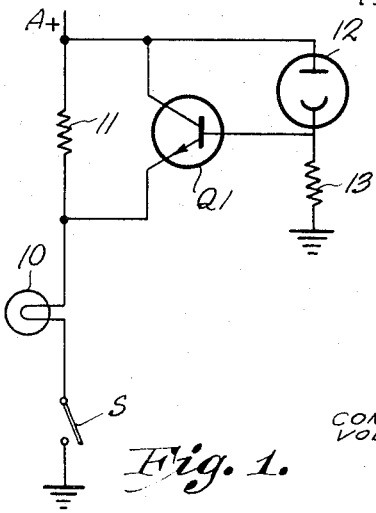
FIG. 1 is a schematic circuit diagram of the signal light system in its basic form.

Referring now to the drawings, and more particularly to FIG. 1, therein is shown the unique basic signalling system which will assist in the understanding of the conceptual approach used to automatically control the brilliance of indicating lamps within a marker beacon receiver system. Consider initially that a source of DC potential, A+, is applied directly to lamp 10 through resistor 11, with the condition responsive switch S, shown open, capable of controlling the OFF–ON condition of lamp 10. It will be obvious that with switch S open, lamp 10 is open circuited and there will be no current flow through lamp 10 to turn on same and that closing switch S completes the circuit and illuminates lamp 10.

The circuit further includes transistor Q1 connected in parallel with resistor 11. A photo-sensitive means such as photocell 12, preferably of the solid state photo resistive type such as cadmium sulfide or cadmium selenide, is part of a voltage divider which includes resistor 13. Photocell 12 is connected in the base-collector circuit of transistor Q1 while resistor 13 connects both the base of Q1 and photocell 12 to ground. The photosensitive means employed therein must have electrical characteristics which vary in accordance with the variations of intensity of light thereon such that when light energy is applied to its photosensitive surface the resistance of the cell decreases. In addition, the photocell 12 is deployed in close proximity to the indicating lamp or lamps which it is used to control.

Consider now the situation when switch S is closed and the ambient light incident on photocell 12 is sufficiently dim to result in the maximum resistance thereof (approximately two or three megohms). When in this atmosphere, the voltage drop across photocell 12 is sufficient to limit the bias on the base of transistor Q1 thereby rendering the transistor nonconductive. In this condition, Q1 appears as an infinite impedance across resistor 11 and there is no current flow from base to emitter, as the base is less positive than the emitter.

The current flow in the lamp 10 leg of the circuit results in a substantial voltage drop across resistor 11 (the only resistive value now between lamp 10 and source A+) and thusly limits the voltage applied to said lamp. As full voltage is not applied to lamp 10, the lamp will be relatively dimly illuminated at substantially less than full brilliance. Thus when photocell 12 is at its maximum resistance, lamp 10 is illuminated but in its most dimly lighted state.

Assume now that the intensity of the light incident on photocell 12 increases or has increased so that the resistive value of the cell decreases thereby decreasing the voltage drop across same. This condition increases the positive bias from the voltage source A+ which is applied to the base of transistor Q1. As soon as the positive bias voltage on the base of Q1 exceeds the emitter voltage of same, base-emitter current will flow (diode action) even though Q1 is not turned ON. The resistive value of photocell 12 is now in parallel with resistor 11 thereby decreasing somewhat the total resistance between the voltage source A+ and lamp 10. Since total resistance is decreased, the voltage drop across same is likewise decreased thereby increasing the voltage to lamp 10 and increased by a proportional amount, the brilliance thereof. This bias on the base of Q1 will continue to increase as the resistance of photocell 12 decreases, due to the light incident thereon, and continues to increase the brilliance of lamp 10 in a similar manner until the bias voltage on the base of Q1 is sufficient to turn Q1 ON. When in this conductive or ON state the transitsor will saturate and short out resistance 11, thereby applying the full A+ voltage to lamp 10. In actual practice, there is a negligible voltage drop across the transistor to the lamp, however the drop is not sufficient to effect the maximum brilliance condition of lamp 10. The exact bias voltage which will turn transistor Q1 ON is correlated for optimum visual effect on the pilot, to the ambient light conditions and thereby full A+ voltage on lamp 10, e.g., maximum lamp brilliance, will only occur in a brightly lighted atmosphere.

It will now be apparent that an opposite result takes place when the light incident on photocell 12 decreases. The resistance of photocell 12 then starts to increase thereby decreasing the positive bias voltage on Q1, eventually turning Q1 OFF and increasing the total resistance between lamp 10 until resistance 11 is the only resistance (and the largest total resistance) between lamp 10 and voltage source A+. This, as mentioned above, is the lowest brilliance condition lamp 10 can have. Accordingly, lamp 10 has two extreme brilliance conditions with many different degrees of brilliance inbetween depending on and proportional to the light incident on photocell 12.

Figure 2:
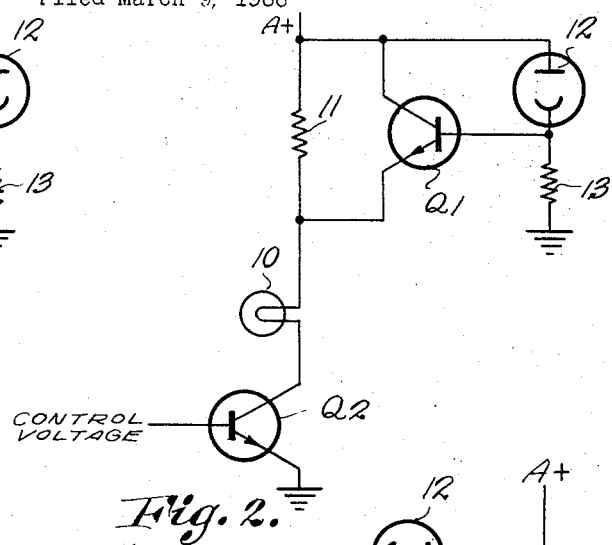
FIG. 2 is a schematic circuit diagram of a similar signal light system incorporating a switching transistor.

FIG. 2 shows a modification of the basic circuit in FIG. 1 in that transistor Q2 has been substituted for the condition responsive switch S. By placing transistor Q2 in series with lamp 10, the OFF-ON (nonconductive-conductive) characteristics of a transistor may be used to selectively energize the signalling system. For effective control of the indicating lamp circuit, transistor Q2 is normally OFF and is turned ON and driven into saturation when the base of transistor Q2 is appropriately biased with a predetermined positive DC voltage. Once in saturation, transistor Q2 connects lamp 10 across the voltage source A+, thereby turning on lamp 10. The brilliance at which lamp 10 will be lighted depends upon the ambient light conditions incident to photocell 12 and regulates same by controlling the bias on transistor Q1. When the bias voltage is removed from the base of transistor Q2, the circuit in FIG. 1 assumes the switch open condition as shown in FIG. 1 and essentially results in the turning OFF (or rendering Q2 nonconductive), thereby extinguishing the lighted effect of lamp 10. By using a transistor to control the signalling system, a great deal of versatility and speed of operation is added and is now an integral feature thereof.

As is well known in the aviation electronics art, marker beacons play a significant and vital role in the safe termination of the flight of an aircraft. Instrument Landing Systems (ILS) have generally been standardized throughout the United States and now include the use of marker beacons which help the pilot as a reminder in reducing speed and descending when approaching the end of an airport runway so that the wheels of the aircraft touch the runway with a minimum of vertical velocity.

Conventional ILS utilize three types of beacons commonly referred to as a fan marker, the outer marker and middle marker. These markers provide the pilot with accurate fixes as to location by informing him of his passage over the beacon stations.

As a general rule the fan marker beacon transmitter and antenna, which may be located on the airway some five to ten miles away from the airport, projects vertically a 75 megacycle cone-shaped pattern. This 75 megacycle signal is amplitude modulated at 3,000 c.p.s., allowing an aircraft equipped with appropriate receiving equipment to receive the 3,000 c.p.s. signal and use it to light a white lamp mounted on the instrument panel while the plane is in this cone-shaped pattern.

The complete ILS includes the above-mentioned outer marker beacon which is placed four to seven miles from the end of the runway and the middle marker beacon which is about 3,200 feet from the runway along the localizer path. The outer marker beacon is normally positioned on the front localizer course near the point where the glide slope approach path intersects the minimum inbound altitude after the procedure turn. The outer marker beacon transmitter projects an elliptical cone-shaped pattern which is amplitude modulated at 400 c.p.s., and received in conventional marker beacon receiving systems on board the aircraft to light a blue lamp, again informing the pilot of his location relative to the runway.

The middle marker transmits a radiation pattern similar in shape to the outer marker, however it is modulated at 1300 c.p.s. and lights an amber lamp on board the aircraft. It is generally contemplated that the receiver systems on board also have means for producing audio tones which are plainly heard in conjunction with the lights. The tones and the lamps combine to present a significant aid to pilots either in daylight or night flying, however, as mentioned above, the closely grouped together lamps can present a problem to the pilot during the very busy and critical operational period of landing the aircraft. For example, if a pilot using the aircraft had previously set the signal lamps for maximum brilliance, as he would have done during daylight flying conditions, the sudden turning on of the indicating lamp in a dimly lit or blackened ambient light condition could either blind or seriously impair the much needed vision of the pilot during the critical landing operations. Likewise, if the signal lamps have been manually set for a relatively low brilliance, and if bright sunlight shines on the indicating lamp, said lamp may very well go unobserved by the pilot. Therefore, a means for automatically controlling the brilliance of the signal lamps of a marker beacon receiver system plays a vital role in the safe and easy operation of any aircraft using same.

Figure 3:
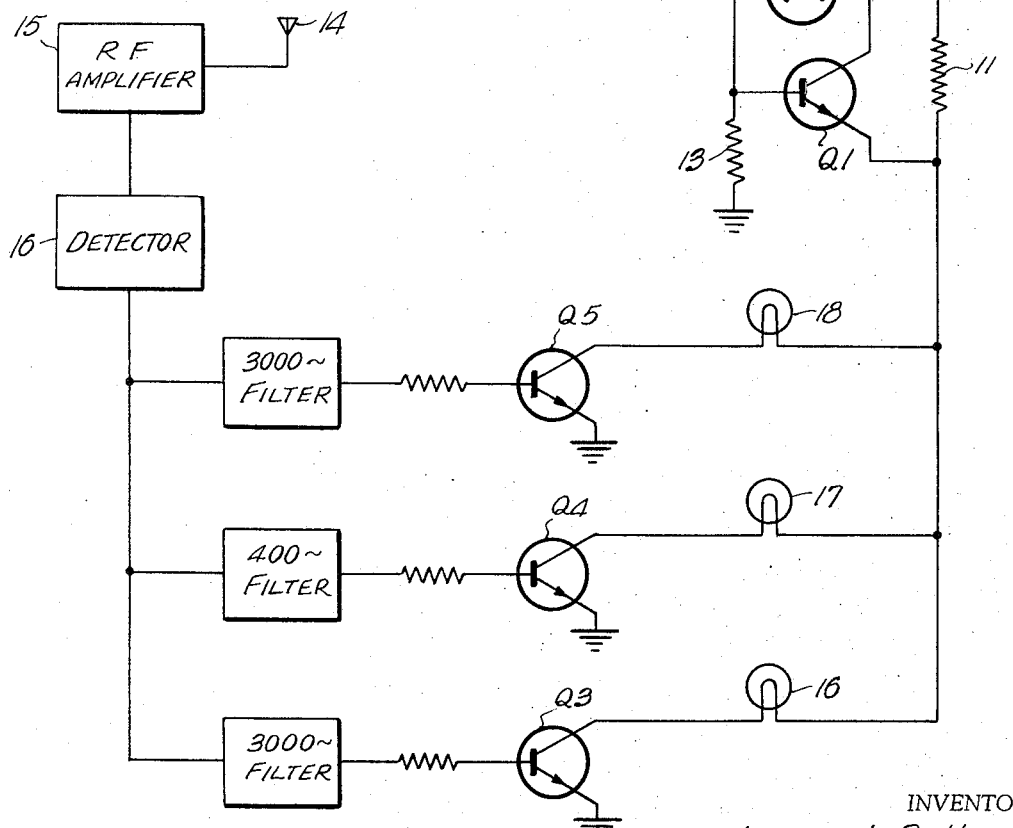
FIG. 3 is a simplified schematic and/or block diagram illustrating the use of the signal light system with a marker beacon receiver system.

FIG. 3 illustrates, by way of example, a marker beacon receiving system incorporating the automatic indicating lamp brilliance control system disclosed above. Reference numeral 14 indicates a loop antenna for receiving the 75 megacycle AM modulated signal. For example, if the aircraft is within the elliptical conical radiation pattern of the middle marker, e.g., when the aircraft is above the middle marker beacon transmitter, antenna 14 receives the 75 megacycle signal which has been amplitude modulated at 1,300 c.p.s. The received signal is amplified in RF amplifier 15, the output of which may either feed the mixer of a superheterodyne or go directly to a detector, same shown and indicated by the numeral 16 in FIG. 3. The detected signal will thereafter be applied to the filter bank designated as the 3,000 c.p.s. filter, the 400 c.p.s. filter and the 1,300 c.p.s. filter. The output from each filter is capable of turning its respective transistor ON (either Q3, Q4 or Q5). As the circuit from the filter actuated transistors to the A+ voltage is the same as that discussed with reference to FIG. 2, it will be obvious that said circuit will control the indicating lamp brilliance as mentioned above. For example, the 1,300 c.p.s. signal will activate the 1,300 c.p.s. filter which will include conventional transistor action to provide a pulsating DC at its output of sufficient positive potential to forward bias the base of transistor Q3. As mentioned above, in a discussion of FIG. 2 and transistor Q2 shown therewithin, the turning ON of transistor Q3 essentially connects amber light 16 across the voltage source A+. There is now a completed current path, either including resistor 11 or through transistor Q1, depending on the ambient light conditions, through indicating lamp 16, transistor Q3 to ground. In actual operation the photocell 12 is located in proximity to the indicating lamps 16, 17 and 18 and therefore will automatically control, in the manner previously described, the brilliance of said indicating lamps for optimum visual indication by the pilot.

Having explained how amber light 16 is lighted by the reception of the 1,300 AM signal, it will be obvious that the fan marker and the outer marker are operable to illuminate or light white light 18 and blue light 17, respectively, in a similar manner. Accordingly, when the aircraft is within the radiation pattern of the fan marker beacon transmitter, the 3,000 c.p.s. filter is activated, transistor Q5 turned on and the white indicating lamp 18 likewise illuminated. In a similar manner, when the aircraft enters the radiation pattern of the middle marker beacon, the 400 c.p.s. filter is activated, transistor Q4 is turned on and the blue indicating lamp 17 illuminated. Of course, photocell 12 is used to control the brilliance of all three lamps in the manner discussed above thereby providing an inexpensive, automatic and completely reliable safety feature for the vision requirements of the pilot.

In addition to the safety feature, the above circuit arrangement provides for a longer life instrumentation panel since the indicating lamps are not constantly operated at full voltage, as was the case when a manually adjusted iris was utilized for dimming purposes.

In the conventional instrument panel on board an aircraft, as well as other indicating lamps regardless of location or use, the above-mentioned indicating lamp brilliance control system may be utilized in all types of signalling systems and is not limited to marker beacon receivers. For example, a transponder test light with a "push to test button" may well make use of the automatic brilliance control discussed herein for the now obvious reasons.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompaning drrawings is to be interpreted as illustrative and not in a limiting sense.

I claim:
1. In an instrument landing system that amplifies, detects, filters and visually indicates an electrical signal derived due to the presence of said system within a marker beacon radiation pattern, said system comprising:
   a voltage source,
   an indicating lamp,
   at least one filter operable to pass said signal,
   a transistor connected between the output of said filter and said lamp, said transistor operable to be turned ON by said electrical signal thereby connecting said lamp across said voltage source and turning said lamp ON,
   means for automatically varying the voltage applied to said lamp from said source, said means responsive to the ambient light conditions so that the brilliance of said lamp will proportionally increase when the ambient light increases and will proportionally decrease when said ambient light decreases.

2. The invention of claim 1 wherein said system includes a plurality of indicating lamps, each lamp capable of giving a single visual indication of the presence of said system within a particular marker beacon radiation pattern that is related to a particular lamp.

3. The invention in claim 2 wherein said system has a plurality of corresponding filters and transistors equal in number to the number of said lamps, each of said filters operable to pass a predetermined electrical signal derived from a particular marker beacon radiation pattern, said filtered signal used to turn ON one of said transistors depending on said beacon pattern thereby connecting a corresponding lamp across said voltage source.

4. The invention in claim 3 wherein said means includes a resistor and a transistor connected in parallel between said voltage source and said lamp, said transistor being responsive to the ambient light conditions and operable to control the voltage drop across said resistor thereby controlling the voltage applied to said lamp so that the brilliance of said lamp will proportionately increase when the amibent light increases and will proportionally decrease when said ambient light decreases.

5. The invention in claim 4 wherein a photosensitive means disposed in proximity to said lamp is operable to control the bias on said transistor.

6. The invention in claim 5 wherein the resistive value of photosensitive means is paralleled with said resistor when said transistor conducts.

7. The invention in claim 6 wherein said photosensitive means is connected in the base-collector circuit of said transistor, said photosensitive means operable to control the bias on the base of said transistor so that base-emitter current will flow thereby paralleling the resistive value of said photosensitive means with said resistor in accordance with predetermined ambient light conditions.

8. The invention in claim 7 wherein said photosensitive means is operable to bias said transistor ON thereby shorting out said resistor when the ambient light increases to a predetermined degree of brightness and to bias said transistor OFF thereby inserting said resistor between said source and said lamp when said ambient light decreases to a predetermined degree of brightness.

9. The invention in claim 4 wherein a photosensitive means disposed in proximity to said lamp is operable to control the bias on said transistor.

10. An aircraft navigation system which visually indicates an electrical signal derived as a result of communication between an aircraft utilizing said system and a ground station, said system comprising:
   a voltage source,
   an indicating lamp,
   at least one filter operable to pass said signal,
   a transistor connected between the output of said filter and said lamp, said transistor operable to be turned on by said electrical signal thereby connecting said lamp across said voltage source and turning said lamp ON, and means for automatically varying the voltage applied to said lamp from said source, said means responsive to ambient light conditions so that the brilliance of the lamp will proportionally increase when the ambient light increases and will proportionally decrease when the ambient light decreases.

References Cited

UNITED STATES PATENTS 2,780,752   2/1957   Aldrich et al. -------- 315—240
3,026,498   3/1962   Galliers ---------- 250—214 X JAMES W. LAWRENCE, *Primary Examiner.*

C. R. CAMPBELL, JR., *Assistant Examiner.*